United States Patent
Tanaka

(10) Patent No.: US 8,169,642 B2
(45) Date of Patent: May 1, 2012

(54) IMAGE FORMING SYSTEM, IMAGE FORMING APPARATUS AND DEVICE, AND RECORDING MEDIUM FOR ERASING DATA IN A MEMORY UNIT

(75) Inventor: Tomoji Tanaka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1345 days.

(21) Appl. No.: 11/582,390

(22) Filed: Oct. 18, 2006

(65) Prior Publication Data

US 2007/0148948 A1 Jun. 28, 2007

(30) Foreign Application Priority Data

Dec. 28, 2005 (JP) .................................. 2005-380473

(51) Int. Cl.
*G06F 3/12* (2006.01)
*G06F 15/167* (2006.01)
(52) U.S. Cl. ........................................ 358/1.15; 709/216
(58) Field of Classification Search ........................ None
See application file for complete search history.

(56) References Cited

U.S. PATENT DOCUMENTS

| | | | |
|---|---|---|---|
| 6,872,015 B2 * | 3/2005 | Roosen et al. | 400/61 |
| 7,209,253 B2 * | 4/2007 | Takayama | 358/1.15 |
| 7,356,564 B2 * | 4/2008 | Hartselle et al. | 709/206 |
| 2006/0092433 A1 * | 5/2006 | Stevens et al. | 358/1.1 |
| 2007/0288664 A1 * | 12/2007 | Kim | 710/1 |
| 2007/0296932 A1 * | 12/2007 | Suzuki | 355/18 |
| 2008/0307333 A1 * | 12/2008 | McInerney et al. | 715/764 |

FOREIGN PATENT DOCUMENTS

| | | | |
|---|---|---|---|
| JP | 2000-330752 A | | 11/2000 |
| JP | 2003-050685 | | 2/2003 |
| JP | 2004-230617 A | | 8/2004 |
| JP | 2004-260482 | | 9/2004 |
| JP | 2011014103 A | * | 1/2011 |

OTHER PUBLICATIONS

Notification of Reasons for Refusal in JP 2005-380473 dated Oct. 14, 2008, and a English Translation thereof.

* cited by examiner

*Primary Examiner* — Twyler Haskins
*Assistant Examiner* — Barbara Reinier
(74) *Attorney, Agent, or Firm* — Buchanan Ingersoll & Rooney PC

(57) ABSTRACT

An image forming system includes a first image forming apparatus and a second image forming apparatus that are connected to each other via a network. The first image forming apparatus includes a transmitter unit transferring reproduced data of data for transfer to the second image forming apparatus via the network, a memory unit storing the data for transfer, and a data eraser unit erasing the data in the memory unit and transmitting an instruction to erase the corresponding data to the second image forming apparatus when a user inputs an instruction to erase the data for transfer. The second image forming apparatus includes a receiver unit receiving the transferred data, a memory unit storing the received data, and an eraser unit erasing the corresponding data in the memory unit according to the erase instruction transmitted from the first image forming apparatus.

24 Claims, 11 Drawing Sheets

IMAGE FORMING SYSTEM, IMAGE FORMING APPARATUS AND DEVICE, AND RECORDING MEDIUM FOR ERASING DATA IN A MEMORY UNIT

The present application claims priority under 35 U.S.C. §119 to Japanese Patent Application No. 2005-380473 filed on Dec. 28, 2005, and the disclosure of which is incorporated herein by reference in its entirely.

BACKGROUND OF THE INVENTION

1. Field of the Invention

The present invention relates to an image forming system that allows data transfer from an image forming apparatus to another image forming apparatus by user's instruction or for backup or an image forming system that allows data transfer as the data are attached to an e-mail from an image forming apparatus to a device, and an image forming apparatus, a device, and a data erase program for use in the system.

2. Description of the Related Art

The following description sets forth the inventor's knowledge of related art and problems therein and should not be construed as an admission of knowledge in the prior art.

As generally known, in conventional common network-connected image forming apparatuses, image data such as facsimile (hereinafter, referred to as FAX) data, print data, and scan data are used repeatedly as the data are stored in a hard disk drive (hereinafter, referred to also as HDD) therein.

In regard to the HDD, a typical memory device in such an image forming apparatus, there is a concern about partial or entire destruction of the stored data due to breakdown of HDD itself or other reasons, because of its mechanical structure. Thus, Japanese Unexamined Patent Publication No. 2004-230617 proposes a method of improving the security of data stored in an image forming apparatus by backuping periodically the data in a HDD of a printer connected to the same network, and thus this method enables the stored data recoverable just in case.

On the other hand, to prevent insufficient memory causes slowdowns of printer processing, that results from the large increase of stored data due to various functions added to printers, Japanese Unexamined Patent Publication No. 2000-330752 proposes a method of transferring the data into another printer temporarily for efficient use of the memory in the image forming apparatus.

However, the conventional methods described above may cause a problem that, even when a user intends to erase data stored in an image forming apparatus and inputs an erase instruction on the image forming apparatus, the transferred data at the transfer destination practically remains unerased, contrarily to user's original intension. In particular when the data to be erased is, for example, a confidential document, there will be a problem of insufficient security. Such a problem arises similarly even when the data is transferred to another image forming apparatus or sent to another device as e-mail-attached data according to user's instruction, or in an image forming system when the data is periodically back-upped, for example at night, into another image forming apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

An object of the present invention is to provide an image forming system that prevents the decrease in security due to data remaining unerased in another image forming apparatus or a device when the data is transferred directly or as e-mail-attached data to the other image forming apparatus or the other device according to user's instruction or for backup.

Another object of the present invention is to provide an image forming apparatus, which is able to be used in the image forming system accordingly.

Yet another object of the present invention is to provide a device, which is able to be used in the image forming system accordingly.

Yet another object of the present invention is to provide a recording medium carrying a data erase program to make a computer execute the program that prevents the decrease in security due to data remaining unerased in an image forming apparatus or a device when the data is transferred directly or as e-mail-attached data to the other image forming apparatus or the device according to user's instruction or for backup.

A first aspect of the present invention is an image forming system including a first image forming apparatus and a second image forming apparatus that are connected to each other via a network, the first image forming apparatus, comprising:
  a transmitter unit transferring reproduced data of data for transfer to the second image forming apparatus via the network;
  a memory unit storing the data for transfer; and
  a data eraser unit erasing the data in the memory unit and transmitting an instruction to erase the corresponding data to the second image forming apparatus when a user inputs an instruction to erase the data for transfer, and the second image forming apparatus, comprising:
  a receiver unit receiving the transferred data;
  a memory unit storing the received data; and
  an eraser unit erasing the corresponding data in the memory unit according to the erase instruction transmitted from the first image forming apparatus.

A second aspect of the present invention is an image forming system including an image forming apparatus and a device receiving data-attached e-mail therefrom that are connected to each other via a network, the image forming apparatus, comprising:
  a transmitter unit transferring an e-mail carrying attached reproduction data of data for transfer to a particular address via the network;
  a memory unit storing the data for transfer; and
  a data eraser unit erasing the data in the memory unit and notifying an instruction to erase the corresponding data attached to the e-mail to the device when a user inputs an instruction to erase the data for transfer, and the device, comprising:
  a receiver unit receiving the e-mail;
  a memory unit storing the data attached to the received e-mail; and a data eraser unit erasing the corresponding data in the memory unit according to the erase instruction notified from the image forming apparatus.

A third aspect of the present invention is an image forming apparatus, comprising:
- a transmitter unit transferring reproduction data of data for transfer via a network to another image forming apparatus;
- a memory unit storing the data for transfer; and
- a data eraser unit erasing the data in the memory unit and notifying an instruction to erase the corresponding data to the other image forming apparatus when a user inputs an instruction to erase the data for transfer.

A fourth aspect of the present invention is an image forming apparatus, comprising:
- a transmitter unit transferring an e-mail carrying attached reproduction data of data for transfer via a network to a particular address;
- a memory unit storing the data for transfer; and
- a data eraser unit erasing the data in the memory unit and notifying an instruction to erase the corresponding data attached to the e-mail to a device capable of receiving the e-mail when a user inputs an instruction to erase the data for transfer.

A fifth aspect of the present invention is an image forming apparatus, comprising:
- a receiver unit receiving reproduction data of data for transfer transferred from another image forming apparatus via a network;
- a memory unit storing the received data; and
- a data eraser unit that, when a user inputs an instruction to erase the data for transfer on the other image forming apparatus, erases the corresponding data in the memory unit according to the erase instruction notified from the other image forming apparatus.

A sixth aspect of the present invention is a device, comprising:
- a receiver unit receiving an e-mail carrying an attached reproduction data of data for transfer transferred from an image forming apparatus via a network;
- a memory unit storing the data attached to the received e-mail; and
- a data eraser unit that, when a user inputs an instruction to erase the data for transfer on the image forming apparatus, erases the corresponding e-mail-attached data in the memory unit according to the data erase instruction notified from the image forming apparatus.

A seventh aspect of the present invention is a recording medium storing a data erase program to make a computer provided in an image forming apparatus execute processing comprising the steps of:
- transferring reproduction data of data for transfer via a network to another image forming apparatus;
- storing the data for transfer in a memory unit of the image forming apparatus; and
- erasing the data in the memory unit and notifying an instruction to erase the corresponding data to the other image forming apparatus when a user inputs an instruction to erase the data for transfer on the image forming apparatus.

An eighth aspect of the present invention is a recording medium storing a data erase program to make a computer provided in an image forming apparatus execute processing comprising the steps of:
- transferring an e-mail carrying attached reproduction data of data for transfer via a network to a particular address;
- storing the data for transfer in a memory unit of the image forming apparatus; and erasing the data in the memory unit and notifying an instruction to erase the corresponding data attached to the e-mail to a device capable of receiving the e-mail when a user inputs an instruction to erase the data for transfer on the image forming apparatus.

A ninth aspect of the present invention is a recording medium storing a data erase program to make a computer provided in an image forming apparatus execute processing comprising the steps of:
- receiving reproduction data of data for transfer transferred from another image forming apparatus via a network;
- storing the received data in a memory unit of the image forming apparatus; and
- when a user inputs an instruction to erase the data for transfer on the other image forming apparatus, erasing the corresponding data in the memory unit according to the data erase instruction notified from the other image forming apparatus.

A tenth aspect of the present invention is a recording medium storing a data erase program to make a computer execute processing comprising the steps of:
- receiving an e-mail carrying attached reproduction data of data for transfer transferred from an image forming apparatus via a network;
- storing the data attached to the received e-mail in a memory unit; and
- when a user inputs an instruction to erase the data for transfer on the image forming apparatus, erasing the corresponding e-mail-attached data in the memory unit according to the data erase instruction notified from the image forming apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

<Entire Configuration>

Figure 1:
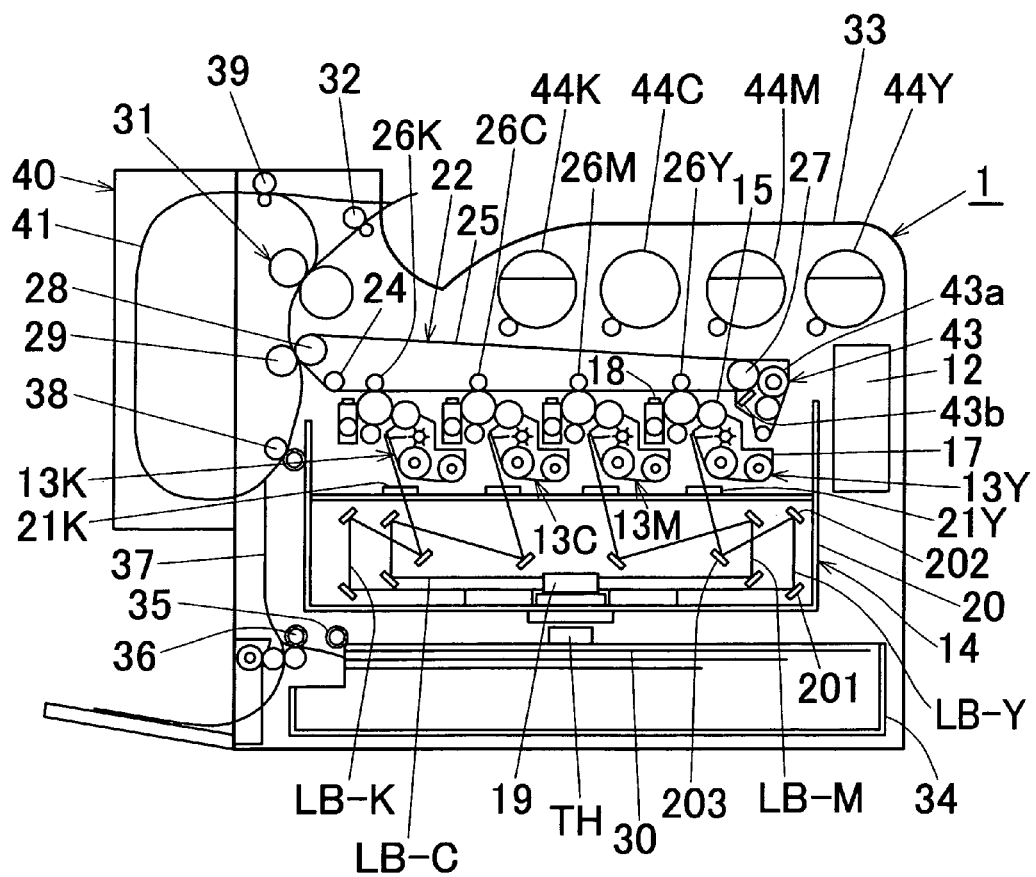
FIG. 1 is a schematic view illustrating the entire configuration of a tandem color printer, as an image forming apparatus in an embodiment of the present invention.
Figure 2:
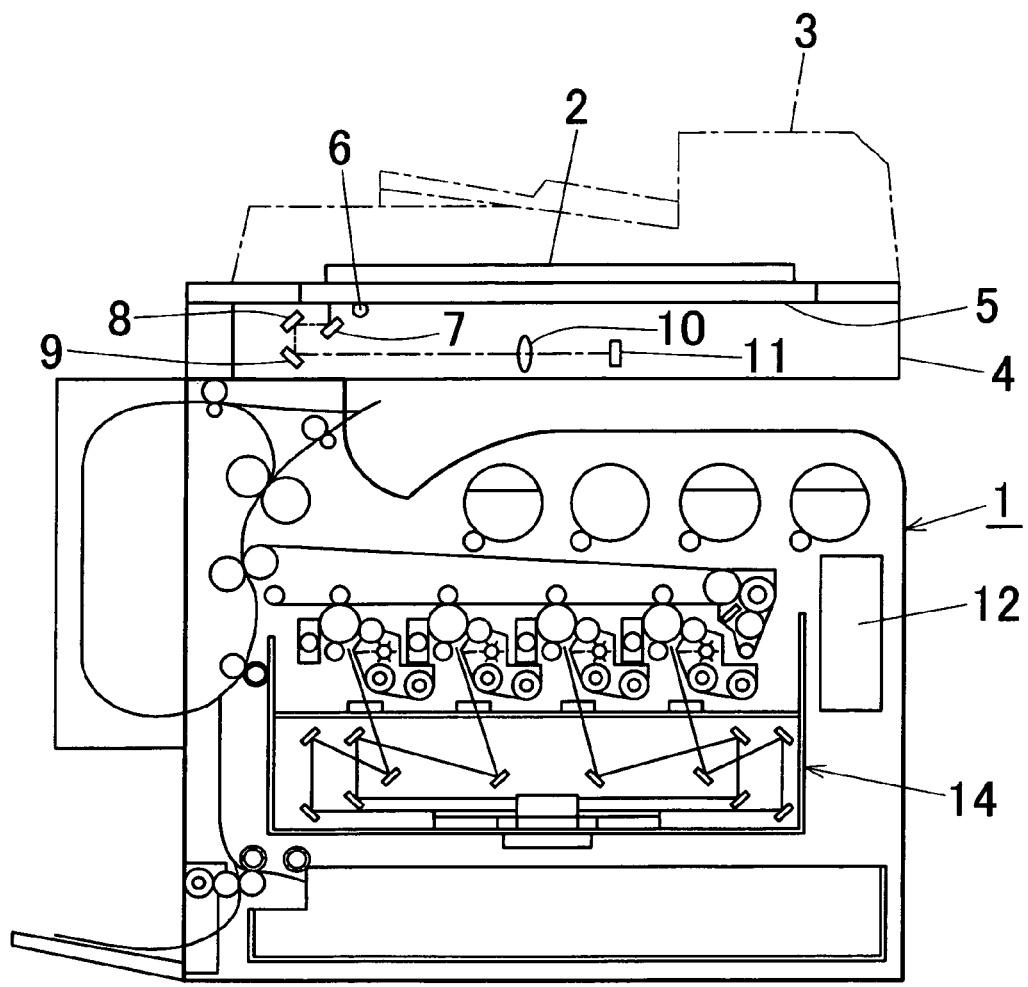
FIG. 2 is a schematic view illustrating the entire configuration of a tandem color copying machine, as an image forming apparatus in an embodiment of the present invention.

FIG. 1 is a view illustrating a tandem digital color printer, as an image forming apparatus in an embodiment of the present invention. FIG. 2 is a view illustrating a tandem digital color copying machine, as an image forming apparatus in an embodiment of the present invention.

In FIG. 1 or 2, the main body 1 represents the main body of a tandem digital color printer or copying machine; and as shown in FIG. 2, the main body 1 of the digital color copying machine has, in the upper region thereof, an automatic document feeder (ADF) 3 feeding an original sheet 2 separately one by one and automatically, and an image reading unit 4 reading the image on the original 2 fed by the automatic document feeder 3. The configuration of the main body 1 in FIG. 2 is the same as the configuration of the main body 1 in FIG. 1, and thus, most of the reference codes for the main body 1 in FIG. 2 are omitted.

The image reading unit 4 irradiates the original 2 placed on a platen glass 5 from using a light source 6, and scans the optical image reflected from the original 2 via an optical image down-sizing system consisting of a full-rate mirror 7, half-rate mirrors 8 and 9 and an image forming lens 10 onto an image reading element 11, for example of CCD, and reads the optical image reflected from the original 2 at a particular dot density (for example, 16 dot/mm) with the image reading element 11.

The optical image reflected from the original 2 read out by the image reading unit 4 is sent to an image processing unit 12, for example, as reflectance data in three colors, red (R), green (G), and blue (B) (respectively, 8 bits); and the reflectance data of the original 2 is given predetermined image processing such as shading correction, alignment correction, lightness/color space conversion, gamma correction, frame elimination, and graphics editing like color/position, in the image processing unit 12.

Image data sent from a personal computer and others are also given the predetermined image processings in the image processing unit 12. Furthermore, the image data processed accordingly in the image processing unit 12 as described above is converted to color tone data for original color reproduction in four colors, yellow (Y), magenta (M), cyan (C) and black (K) (respectively, 8 bits), in the same image processing unit 12; the color tone data are then sent to a print head unit 14 facing image forming units 13Y, 13M, 13C, and 13K respectively in colors, yellow (Y), magenta (M), cyan (C), and black (K) as will be described below; and the print head unit 14, as an image exposure unit, optical-forms the image according to the color tone data for each particular color, using the laser beam LB.

As shown in FIG. 1 or 2, four image forming units 13Y, 13M, 13C, and 13K, respectively in yellow (Y), magenta (M), cyan (C), and black (K), are placed in the horizontal direction at a certain interval inside the main body 1 of the tandem digital color printer or the tandem copying machine. Each of these four image forming units 13Y, 13M, 13C, an 13K has a similar configuration, and has mainly a photosensitive drum 15 used as an image carrier rotating at a particular speed, an electrification roll 16 for primary electrification, electrifying the surface of the photosensitive drum 15 uniformly, a print head unit 14 used as an image exposure unit, forming an electrostatic latent image for each particular color by optical-scanning on the surface of the photosensitive drum 15, a developing unit 17 developing with toner for each particular, the electrostatic latent image formed on the photosensitive drum 15, and a cleaning unit 18 cleaning the surface of the photosensitive drum 15.

As shown in FIGS. 1 and 2, the print head unit 14, which is shared with the four image forming units 13Y, 13M, 13C and 13K, is configured to modulate four semiconductor lasers not shown in the Figures, according to the each color's color tone data for original color reproduction, and irradiates with laser beams LB-Y, LB-M, LB-C and LB-K from the semiconductor lasers, also according to the color tone data.

The print head unit 14 may of course be installed for each of the multiple image forming units. Each of the laser beams LB-Y, LB-M, LB-C, and LB-K from the four semiconductor lasers is irradiated to a rotating polygon mirror 19 and then deflected and scanned by the rotating polygon mirror 19.

Among the laser beams LB-Y, LB-M, LB-C, and LB-K from the four semiconductor lasers, laser beams LB-Y and LB-M are irradiated to one side of the rotating polygon mirror 19, while the other laser beams LB-C and LB-K are irradiated to the opposite side of the rotating polygon mirror 19; and deflected and scanned by the rotating polygon mirror 19. As a result, the laser beams LB-Y and LB-M, and the laser beams LB-C and LB-K are deflected and scanned by the rotating polygon mirror 19 in the opposite directions from each other.

The laser beams LB-Y, LB-M, LB-C, and LB-K deflected and scanned by the rotating polygon mirror 19 are reflected through an f-θ lens not shown in the Figure by multiple reflection mirrors 201 to 203, and optical-scanned on the photosensitive drum 15 in each image forming unit through a window 21, upward diagonally. In this way, an electrostatic latent image in each color is formed on the surface of the photosensitive drum 15.

As described above, in the print head 14 of the present embodiment, four laser beams LB-K, LB-Y, LB-M, and LB-C from the four semiconductor lasers not shown in the Figures, are divided into two directions, to be irradiated to the opposite faces of the rotating polygon mirror 19 from each other for deflection. And thus, the laser beams LB-Y and LB-M deflected one side of the rotating polygon mirror 19, and the laser beams LB-C and LB-K deflected the opposite side of the rotating polygon mirror 19, have opposite scanning directions of the laser beams irradiating the surface of the photosensitive drum 15.

As shown in FIGS. 1 and 2, the electrostatic latent image formed on the photosensitive drums 15 is then developed by each developing unit 17 into toner image in colors, yellow (Y), magenta (M), cyan (C), and black (K) respectively. The toner image in yellow (Y), magenta (M), cyan (C), or black (K) formed sequentially on the photosensitive drum 15 in each image forming unit 13Y, 13M, 13C, or 13K is transferred sequentially in multiple layers onto an intermediate transfer belt 25 in an intermediate transfer belt unit 22 placed above the image forming units 13Y, 13M, 13C and 13K, by each primary transfer roll 26Y, 26M, 26C, or 26K.

The intermediate transfer belt 25 is pulled by a drive roll 27, a backup roll 28, and a tension roll 24 at a certain tension and driven around the rolls by the drive roll 27, which revolves powered by a dedicated driving motor superior in consistency in speed that is not shown in the Figures. The intermediate transfer belt 25 is an endless belt made from synthetic resin such as flexible polyimide, which both ends are connected to each other, for example, deposited.

The toner image in yellow (Y), magenta (M), cyan (C), and black (K), transferred sequentially in multiple layers onto the intermediate transfer belt 25 are re-transferred by pressure and electrostatic force applied by the secondary transfer roll 29 in tight contact with the backup roll 28 onto the transfer sheet 30 used as an image receiving medium, and the transfer sheet 30 carrying the toner image in each color is then conveyed to a toner fixing unit 31 located above.

The secondary transfer roll 29 is located next to the backup roll 28, and secondary-transfers the toner image in each color collectively onto the transfer sheet 30 conveyed upward from the lower level. The transfer sheet 30 carrying the toner image in each color is then toner-fixed by heat and pressure applied in the toner fixing unit 31; and discharged onto a discharge receiving tray 33 placed on the top of the main body 1 by a discharging roll 32. As shown in FIGS. 1 and 2, the selected size of the transfer sheet 30 is conveyed from a paper feeding cassette 34 along a paper path 37 to a resist roll 38, by a sheet supplying roll 35 and a pair of rolls 36 for separation and conveyance of paper, and then held there.

The transfer sheet 30 fed from the paper feeding cassette 34 is conveyed to the secondary transfer position on the intermediate transfer belt 25 by the resist roll 38 that revolves at a particular timing. When the digital color printer or the digital copying machine is used for a double-faced copy of full color for example, the transfer sheet 30 carrying image on one face is not discharged onto the discharge receiving tray 33 by the discharging roll 32, but the conveying direction is redirected by a switching gate not shown in the Figures, and the transfer sheet 30 is sent via a pair of paper conveying rolls 39 into a double-faced-paper conveying unit 40. In the double-faced-paper conveying unit 40, the transfer sheet 30 is conveyed to the resist roll 38 once again after a pair of conveying rolls which are not shown in the Figure and placed along the conveyance route 41, reverses the transfer sheet 30; additional image is transferred and toner-fixed on the opposite face of the transfer sheet 30; and the printed transfer sheet 30 is then discharged onto the discharge receiving tray 33.

In FIGS. 1 and 2, each of 44Y, 44M, 44C, and 44K represents a toner cartridge supplying toner of particular color to each of the developing units 17 of yellow (Y), magenta (M), cyan (C), or black (K).

<Features of the Invention>

Hereinafter, features of an embodiment of the present invention will be described with reference to drawings.

Figure 3:
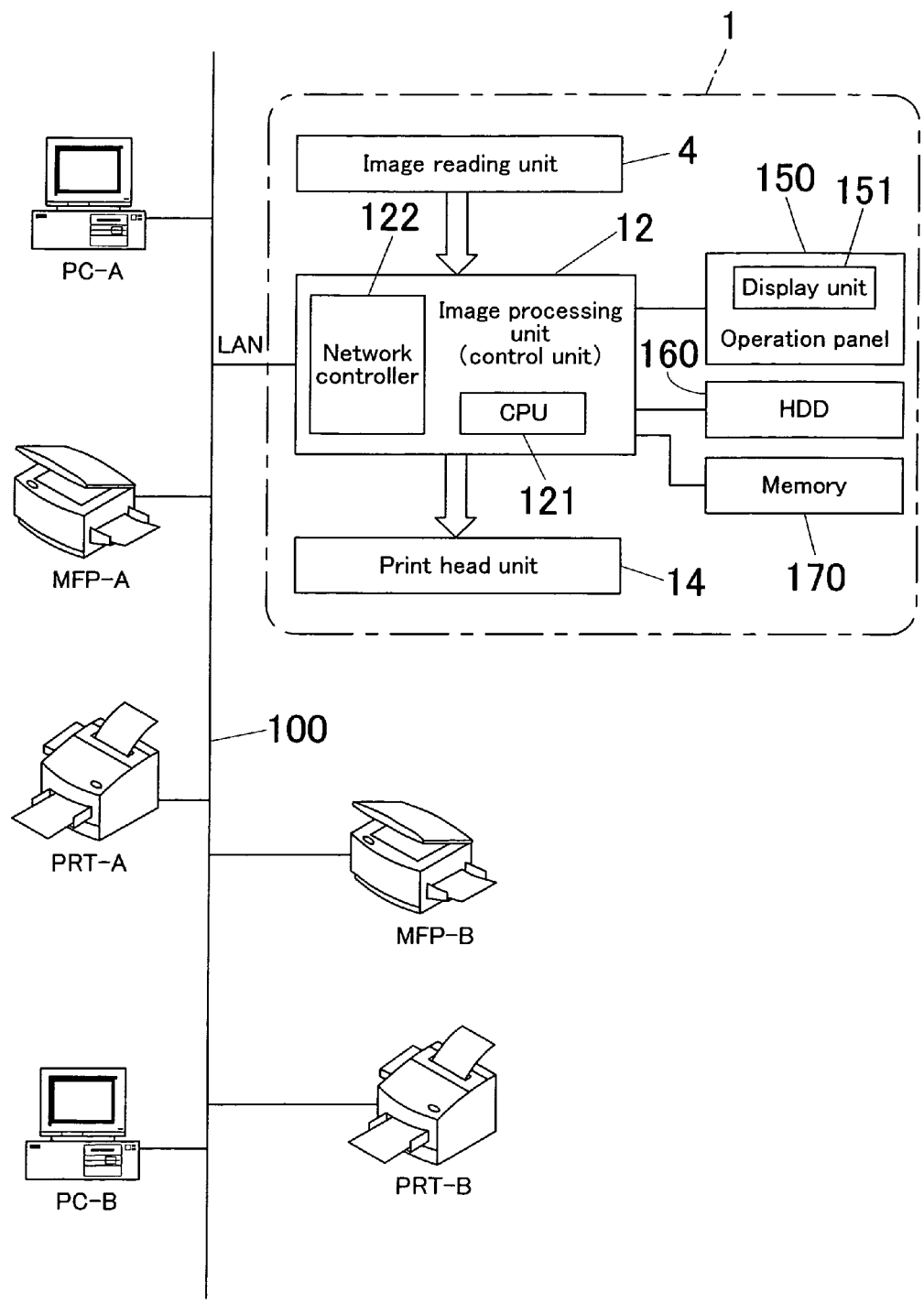
FIG. 3 is a view illustrating the entire configuration of an image forming system including a functional block diagram of the image forming apparatus shown in FIG. 2.

FIG. 3 includes a functional block diagram of the image forming apparatus 1 and a view illustrating the configuration of the entire image forming system. FIG. 3 also applies to other image forming apparatuses such as multifunctional copying machines MFP-A and MFP-B. While the configuration of a multifunctional copying machine equipped with an image reading unit that is connected to a LAN network 100 will be described in the present embodiment, everything that doesn't include the image reading unit 4 in the functional diagram of the image forming apparatus 1 may be regarded as a printer PRT-A or PRT-B in FIG. 3.

The image forming apparatus 1 is connected via the LAN to multiple computer terminals PC-A and PC-B, the multiple multifunctional copying machines MFP-A and MFP-B, and the multiple printers PRT-A and PRT-B. On the other hand, each computer terminal PC-A or PC-B or each multifunctional copying machine MFP-A or MFP-B has a large-capacity hard disk drive (HDD) 160 inside, as a data memory unit, and thus, is capable of storing a variety of data.

The image forming apparatus 1 has an operation panel 150 for input/output of image data and for setting various functions, and the operation panel 150 has a display unit 151 such as of liquid crystal for displaying various functional settings. The image data retrieved from the image reading unit 4 is input into an image processing unit 12 containing a CPU 121 for control of the entire image forming apparatus 1, and stored in its HDD 160 for temporary or permanent storage, as image data in a known compression format such as JBIG.

The compressed image data once stored is retrieved from the HDD 160, decompressed, given image processing such as highlighting of particular edges, smoothing, and color tone reproduction, and then, sent to the print head unit 14 at a timing synchronous to emission of the laser in the print engine.

On the other hand, a network controller 122, representing a transmitter or receiver unit in the image processing unit 12, controls other LAN-connected image forming apparatuses and computer terminals via the LAN, and sends and receives any data in the HDD 160 including image data for print or scanned image data and Box data. The PDL (Page Description Language) image data transferred from a computer terminal is converted by the CPU 121 in the image processing unit 12 to raster data, which are stored in the HDD 160 as compressed image data similarly to the scanned image data described above, read and decompressed once again, given predetermined image processings, and then sent to the print engine. The HDD 160 stores a great amount of data, including scanned image data retrieved as Box storage data and the data retrieved into the HDD 160 in the image forming apparatus 1 from computer terminals PC-A and PC-B, organized in a predetermined folder configuration.

Hereinafter, the security level of the data stored in the HDD 160 in the image forming apparatus 1 will be described, with reference to FIG. 4. As for the data stored in the HDD 160 in the image forming apparatus 1 described above, security is set at a certain level to each of folder or file data. In the present example, the security levels are divided into three levels including no security setting. LEVEL 1 assumed as no security setting; LEVEL 2 assumed as low-security-level setting; and LEVEL 3 assumed as high-security-level setting; and it is possible to set access restriction on the file data or folder according to each security level. For convenience in the present embodiment, the invention will be described, assuming that a security level is set to each folder.

File data in a folder set to LEVEL 1 are stored as shared data to which every network-connected user can access, file data in a folder set to LEVEL 2 are protected by password previously registered for each user, and no other user can access the file data. File data in a folder set to LEVEL 3 are data protected by password registered for each user and stored as encrypted data together with the identification information specific to device and allow no other user even to take a view of file information (file name, file creator, and last update date) in the folder, for storage of confidential document and others.

While described herein, an example of setting a security level to an individual folder for convenience in the present embodiment, it is also possible to set a security level to an individual file data.

Figure 4:
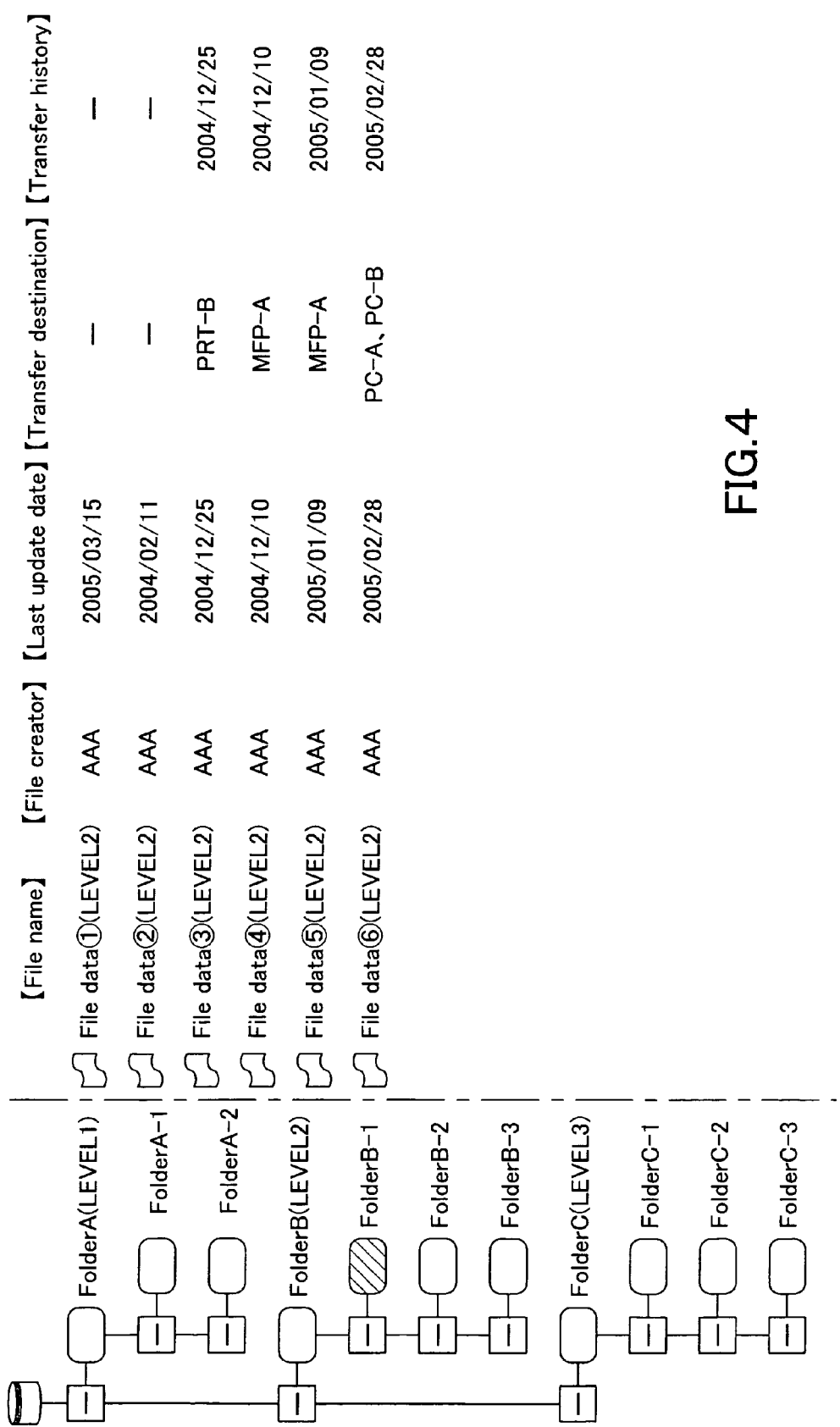
FIG. 4 is a view of the screen of a display unit in an operation panel displaying user file data in HDD.

FIG. 4 shows a screen displayed on the display unit 151 in the operation panel 150. The screen shows folder configuration of the Box data in the HDD described above, and file data stored in a selected folder. It is possible to set a transfer setting to each file data using the screen. As subdirectory of a folder A set to security LEVEL 1, a folder B to LEVEL 2 and a folder C to LEVEL 3, there are folders prepared for individual users and named as A-1, A-2, B-1, B-2 . . . C-3, and each of the users stores file data in his or her folder.

When a folder in upper tier (for example, folder B) is set to LEVEL 2, subfolders B-1, B-2, B-3 and the data stored therein are all turned to LEVEL 2. Although it is of course possible to set a security level for each file data, and to raise the security level only for particular file data, for example to LEVEL 3, the description of how to set a security level on an individual folder or file data is omitted.

In FIG. 4, assuming that subfolder B-1 is selected; details of the file data stored in the subfolder B-1 are shown in the right of the screen. Six file data ① to ⑥ are stored in the folder B-1; file data ③ to ⑥ are already transferred; and file data ① and ② are untransferred. The file name, file creator (same as owner), last update date, transfer destination, and transfer history of each file data are displayed. The file data with no transfer destination and no transfer history are untransferred, and the file data with the transfer information are already transferred and stored in the transfer destination device.

The file data with "PRT-B" or "MFP-A" as transfer destination are already transferred and stored in the HDD 160 respectively in the image forming apparatuses (a printer and a multifunctional copying machine). On the other hand, the file data with "PC-A/PC-B" indicates that that the file data are already transferred as attached to e-mail attachment to PC-A and PC-B. Multiple transfer destinations can be selected no matter whether the file data transfer is done by e-mail or not. As for the folder configuration of the Box data in these HDD's 160 and user's data stored in the selected folder, the user can browse and give an instruction to transfer the data thereof via the network 100 using a computer terminal PC-A or PC-B installed a dedicated utility software.

Hereinafter, file data transfer processing will be described with reference to FIG. 5.

Figure 5:
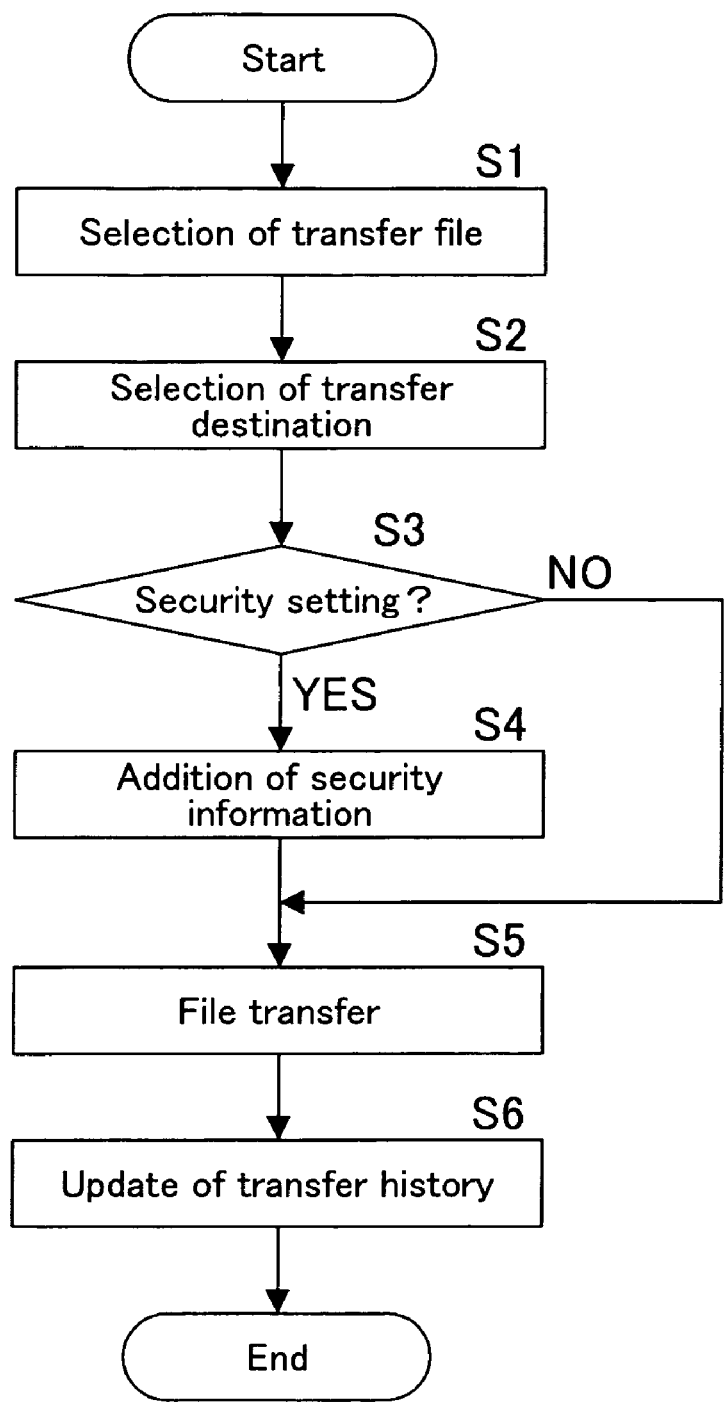
FIG. 5 is a flow chart showing the procedure of transferring file data.

FIG. 5 is a flow chart showing the procedure of transferring file data. The procedure is executed by the CPU 121 in the image processing unit (control unit) according to the program stored in a recording medium, for example, in the memory 170.

First, when a user selects a file data to be transferred (hereinafter, referred to simply as file), the action is accepted by the CPU 121 (step S1), and when a user selects a transfer destination or an e-mail transmission destination, this is also accepted and set (step S2). As described above, it is possible to select multiple transfer or e-mail transmission destinations. The security setting of the file data is then judged with reference to the security information previously set to the file data (step S3) in the image forming apparatus 1 of the present embodiment, LEVEL 1 is defined as no security setting, and LEVEL 2 and LEVEL 3 are defined respectively as a certain security level.

When security is set (LEVEL 2 or 3), (YES in step S3), security level information is added (step S4), and the file data is transferred or sent as an e-mail attachment via the LAN to the transfer destination or the e-mail transmission destination already set (step S5). When there is no security setting (NO in step S3), the file data is transferred or sent as an e-mail attachment without security level information.

The transfer history information, including transfer date and time and transfer-completion information, is stored in the nonvolatile random access memory (NVRAM) 170 (step S6). The recording medium 170 may be used in combination with the HDD 160. The image forming apparatus receiving the file data stores the file data together with the added security information into the memory unit (HDD 160) in the device. The file data attached to e-mail are stored together with the e-mail, in a memory unit (for example, HDD) of the data-receiving computer terminal. In this manner, backup of the data is finally completed.

In this way, any file data in the image forming apparatus 1 are transferred to another image forming apparatus MFPA, MFPB, PRT-A, or PRT-B connected to the network 100 and stored therein, or to a computer terminal PC-A or PC-B as data attached to e-mail.

Described above is the procedure of transfer setting of file data previously stored in the HDD 160 in image forming apparatus 1, and the same procedure may apply also when an original document is scanned according to an instruction such as "Scan to e-mail" or "Scan to Box". It is also possible to make the data in the HDD of the image forming apparatus 1, backuped collectively and periodically in the HDD of another image forming apparatus, but description of the procedure is omitted because the art is already heretofore known.

Figure 6:
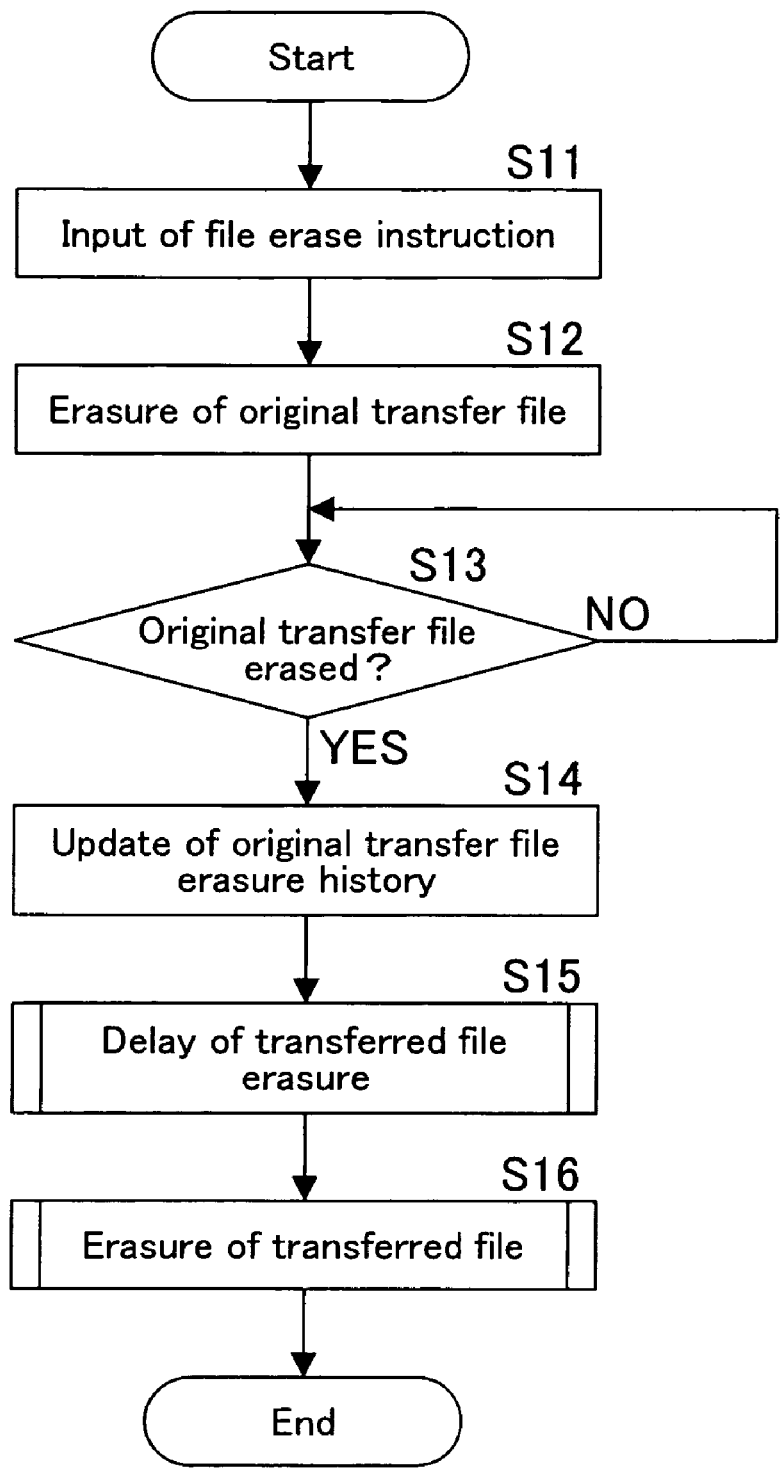
FIG. 6 is a flow chart showing the procedure of erasing file data in a sender image forming apparatus.

FIG. 6 is a flow chart showing the procedure of erasing the file/e-mail-attached file in the sender image forming apparatus 1. The processing is executed by the CPU 121 of the image processing unit (control unit), according to the program recorded in a recording medium such as the memory 170.

First, when a user selects particular file data to be erased and gives an instruction to erase (or delete) the file data, using the operation panel 150 where the display unit 151 displays the folder configuration of the Box data in the HDD 160 and user's data stored in the selected folder described above, the CPU 121 accepts the instruction (step S11).

Then, the file data to be erased are removed from the HDD 160 in the sender image forming apparatus 1 (step S12), and completion of the erasure is judged (step S13). If the file data is not erased yet (NO in step S13), the CPU waits until the erasure is completed. If the file is erased completely (YES in step S13), the erasure history information of the file is updated (step S14), and stored in the nonvolatile random access memory 170.

After delaying the timing of erasure of the transferred file (step S15), finally the transferred file is erased (step S16). The process will be described in detail below.

In the series of processes, it is possible to set delay time (described below) to erase each of the transferred files, but there suppose to be no problem with default settings in most cases, and thus, detailed description thereof is omitted.

Figure 7:
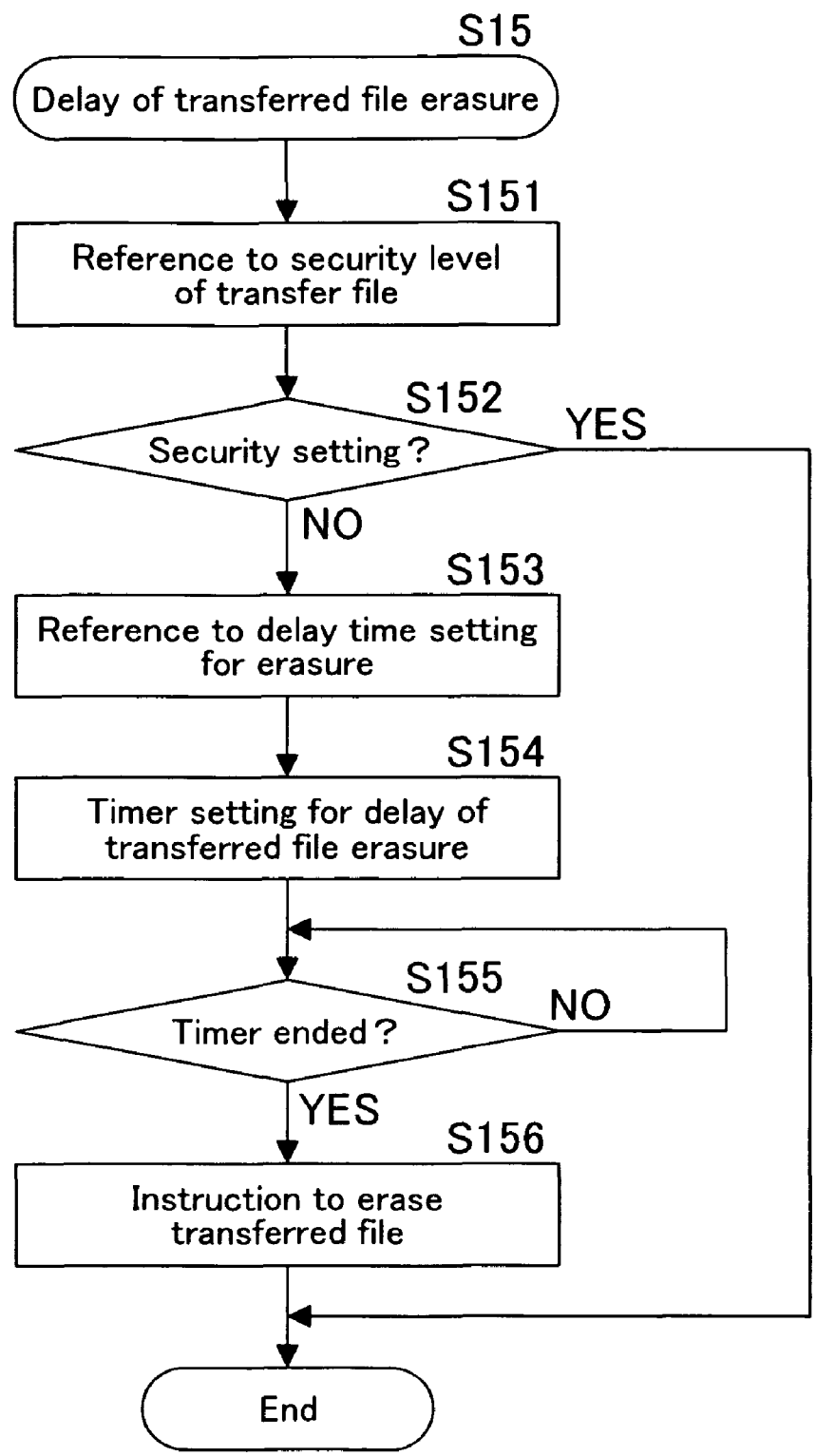
FIG. 7 is a flow chart showing the procedure of delaying the timing of transferred file erasure (step S15) shown in FIG. 6.

Similarly as described above, an individual user can browse folder configuration of the Box data in the HDD 160 and file data stored in a selected folder, specify file data to be erased, and give an erase instruction, from the computer terminal PC-A or PC-B having an installed dedicated utility software via the network 100. FIG. 7 is a flow chart showing the procedure for delaying the timing of erasure of transferred file data shown in FIG. 6 (step S15).

First, the security level of the original transfer file data is referred to (step S151); it is then judged whether security is set or not (step S152); if security is set (YES in step S152), the processing is terminated.

If security is not set (NO in step S152), referring to the previously determined delay time setting table for erasure (step S153), a delaying timer to delay the timing of erasing the transferred file is set (step S154). The count of the delaying timer is judged (step S155); if the countdown is not completed (NO in step S155), the system waits until it is completed; and if completed (YES in step S155); an instruction to erase the file transferred to the destination device is given (step S156).

An initial value is set on the delaying timer responsible for the timing of erasing file depending on the security level described previously. In the present embodiment, the timer count is set to 60 minutes at LEVEL 1, 15 minutes at LEVEL 2, and 0 minute (immediate erasure) at LEVEL 3.

The timers for setting delay time are installed to prevent the deterioration in performance and productivity of the destination apparatus due to the erasure processing of the transferred file in the apparatus itself. Thus, for example, it is possible to set a delaying time in a time zone when the operation rate is not very high (e.g., time zone 60 minutes before lunchtime, when the machine operation rate is lower). On the other hand, as for confidential documents and others to be erased immediately from the viewpoint of security, it is possible to put priority by setting the timer value to "0" for immediate erasure.

Figure 8:
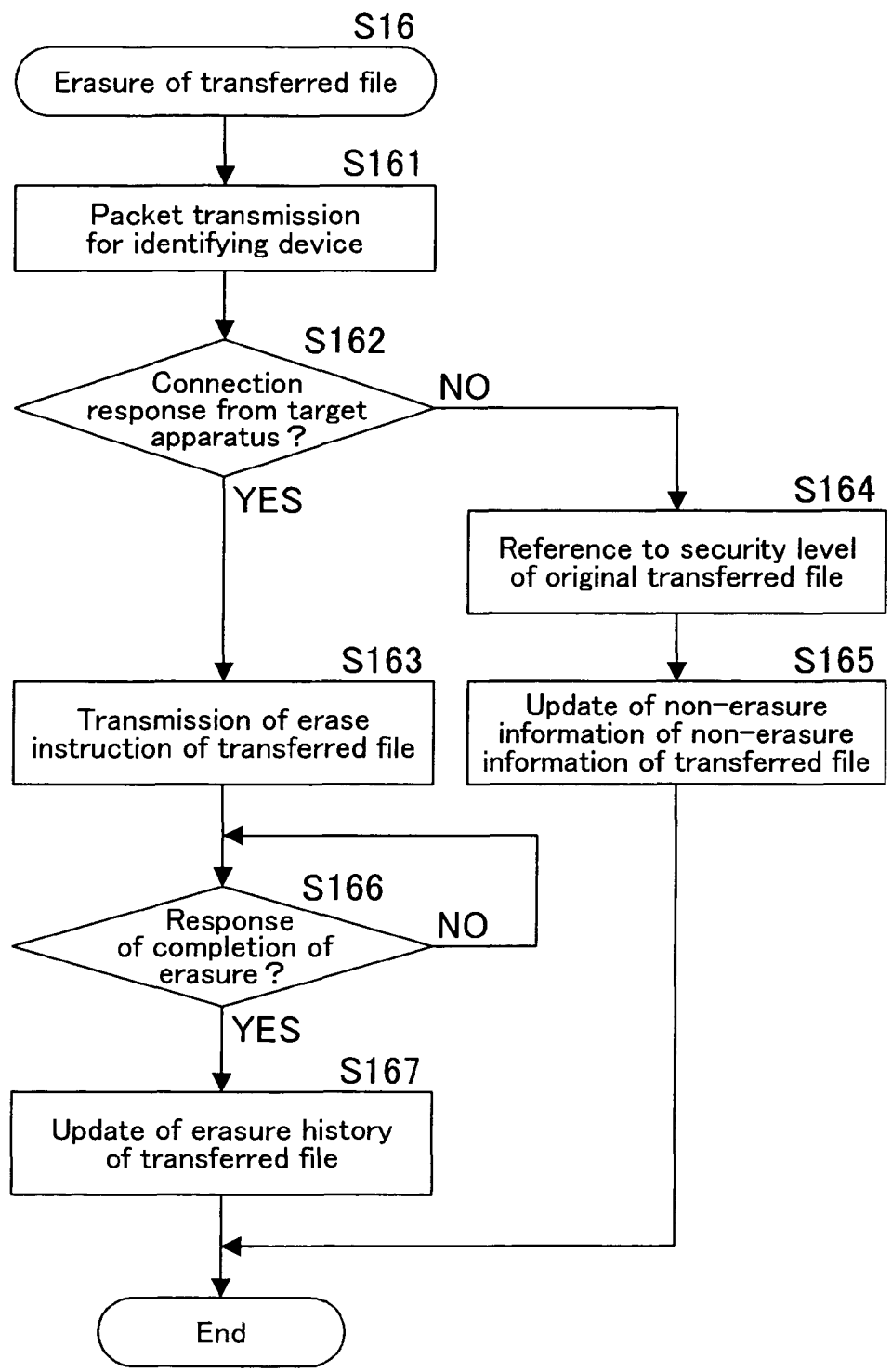
FIG. 8 is a flow chart showing the procedure of erasing a transferred file (step S16) shown in FIG. 6.

FIG. 8 is a flow chart showing the procedure of erasing transferred file shown in FIG. 6 (step S16).

The procedure assumes that network-connected apparatuses in office are not always in operation and other image forming apparatuses containing backup file data and apparatuses to which files attached to e-mail are transferred are often in the non-operating state.

Packet transmission is first conducted via the network 100 to examine whether the destination apparatus is in operation before erasure of the file transferred to the destination apparatus (step S161). The operation state of the destination apparatus is judged by a connection response (step S162); and, if there is a response, i.e., the apparatus is in operation (YES in step S162), the file data is erased by noticing an instruction to erase the transferred file (step S163). Then, an erasure completion response from the destination device is judged (step S166); if there is no completion response (NO in step S166), the system waits until completion; if there is a completion response (YES in step S166), the erasure history information for the transferred file is updated to "erasure completed" and is stored together with the erasure completion time in the nonvolatile memory 170 of the image forming apparatus 1 (step S167).

On the other hand, if there is no connection response from the destination apparatus for a particular time (timeout) (NO in step S162), the destination apparatus is regarded to be in the non-operation state; and, referring to the security level of the original transfer file (step S164), "erasuring", as state information that the transferred file is still unerased and to be erased, is stored in the nonvolatile memory 170 of the image forming apparatus 1 (step S165), and the procedure is terminated.

The security level of the original transfer file is referred to in preparation for possible contingencies, for example, in a case when, although the security level of the original transfer file data is very high, it is not possible to erase the file data at the destination because the destination apparatus is in the non-operation state. When it is not possible to erase confidential documents as described above, it is thus possible to send a warning message, such as "warning: transferred file unerased (no connection response)", by e-mail or other to the user who gave an instruction to erase the file data.

Figure 9:
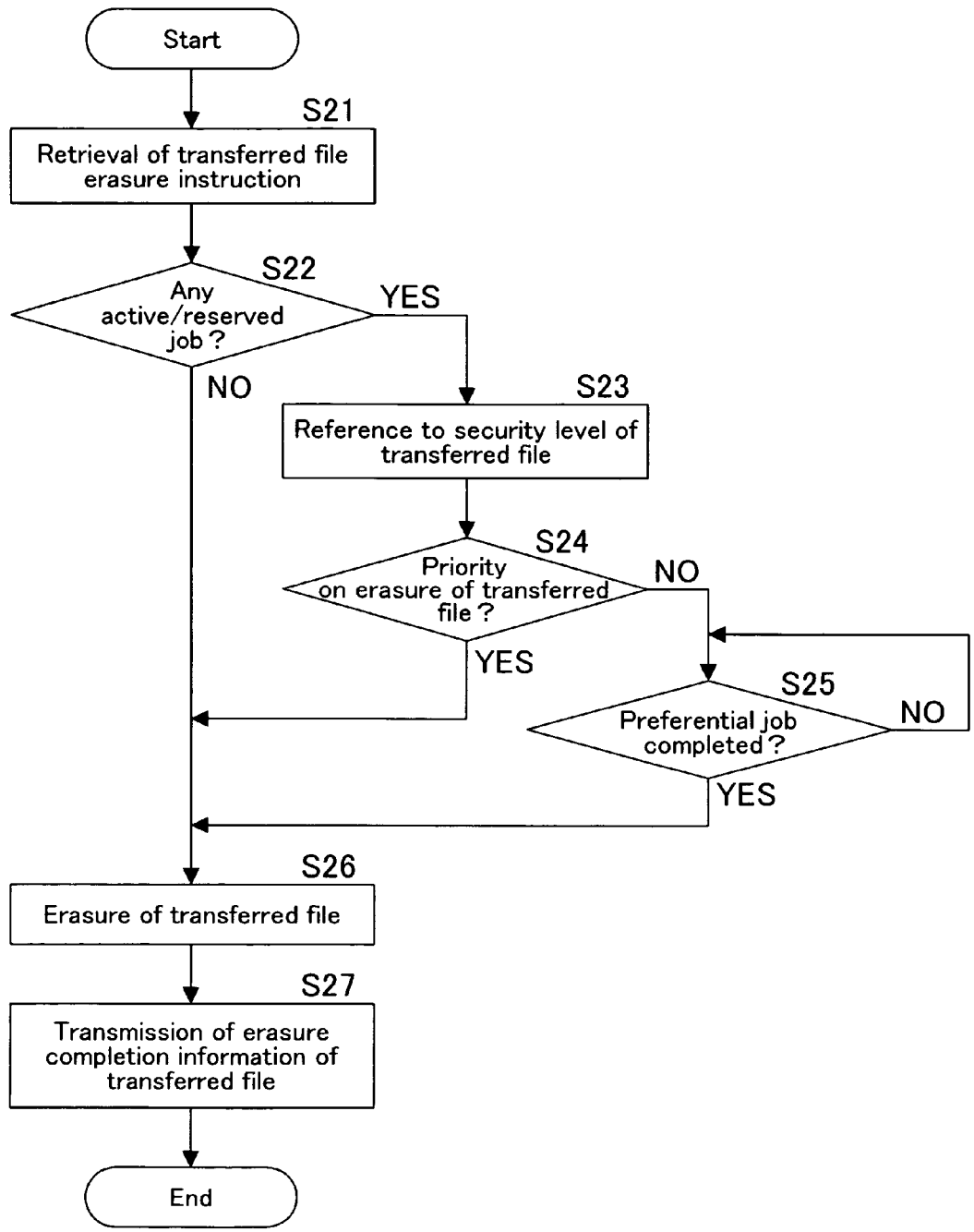
FIG. 9 is a flow chart showing the procedure of erasing transferred data in a transfer destination image forming apparatus.

Hereinafter, the procedure to erase the data in the destination apparatus will be described with reference to FIG. 9. FIG. 9 is a flow chart showing the procedure of erasing processed in the destination image forming apparatus (for example, multifunctional machine MFP-A). The processings are also executed by the CPU 121 in the destination image forming apparatus, for example, according to a program recorded in a recording medium such as the memory 170.

When an instruction to erase the transferred file is received from the sender image forming apparatus 1 (step S21), it is judged whether any active or reserved job in the receiver image forming apparatus or not (step S22). If there is an active job or a reserved job (YES in step S22), referring to the security level of the transferred and stored file data (step S23), the priority order between the file data erasure, and the active job or the reserved job, is judged (step S24).

If the security level of the file data is higher than a predetermined security level (equivalent to LEVEL 3 in the present embodiment), recognizing the file data as a confidential document to be erased in preference to other jobs (YES in step S24), and in such a case, erasure is given preference, and the file data is erased immediately (step S26). On the other hand, if the security level is lower than or equivalent to the predetermined level, recognizing the active job or the reserved job is to be processed in preference (NO in step S24), after the completion of the preferential job (YES in step S25), the file is erased (step S26). In this way, data of the higher security level is erased rapidly, and the high security is ensured.

If there is no active job or reserved job (NO in step S22), the transferred and stored file data is erased immediately (step S6). When a user specifies data to be erased on the image forming apparatus 1, the corresponding data is removed from the HDD 160 in the image forming apparatus 1 and an instruction to erase the transferred file is noticed from the original image forming apparatus 1 that transferred the data to the destination apparatus, and the corresponding file data is eliminated from the HDD 160 in the destination image forming apparatus. Thus, it is possible to prevent such an inconvenience that, although the data in the sender image forming apparatus is removed, the data transferred to another destination image forming apparatus remains unerased, and thus, the security is improved.

Then, information of the erasure completion is sent to the sender image forming apparatus (step S27), and the procedure is terminated.

In regard to the priority order between the file data erasure and the active job or the reserved job depending on the security level of the file data, under the assumption that the destination image forming apparatus is controllable similarly to the sender image forming apparatus, it is possible to reflect the same priority setting to the destination image forming apparatus, using the attached priority order information between the security level of the file data and the active job or the reserved job, in addition to the security level information transferred from the sender image forming apparatus.

Although other jobs in the destination image forming apparatus are described as an active job or a reserved job in the present example above, print job of the transferred and stored file data may practically be an active job or a reserved job. In such a case, even when the file data is being printed, the process is terminated and the file data is erased according to the control procedure described above in the destination image forming apparatus. This process also applies to another case where print or other jobs of the file data are waiting as reserved data.

The priority orders above between the file data erasure and the active job or the reserved job depending on the security level of the filed data, may also apply to the sender image forming apparatus. When an instruction to erase the original transfer file data is input by a user, erasure of the file data is done immediately if the job of the specified transfer file data exists as an active job or a reserved job waiting for print or others, and is done according to the procedure shown in FIG. 9 if any other active or reserved job exists.

Figure 10:
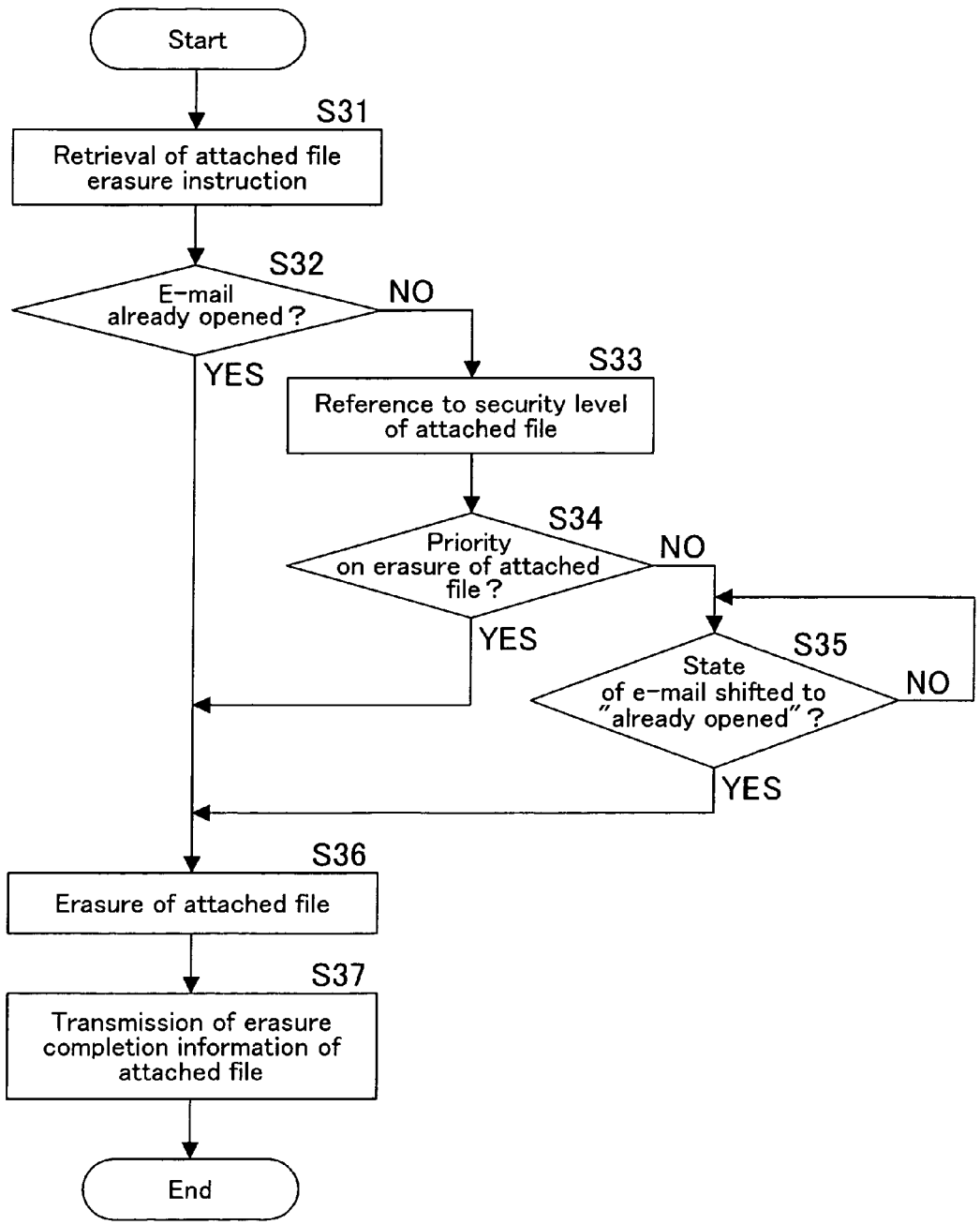
FIG. 10 is a flow chart showing the procedure of erasing the transferred data in a transfer destination device.

FIG. 10 is a flow chart showing the procedure to erase data on an e-mail-receiving computer terminal (for example, PC-A). The processing is executed by the CPU in the computer terminal according to a program recorded in a recording medium not shown in the Figure.

When an instruction to erase attached file data is received from the original transfer image forming apparatus 1 (step S31), it is determined whether the e-mail having the attached file data to be erased is already read (step S32). If it is not read yet (NO in step S32), referring to the security level of the file data (step S33), the priority order between erasure of the file data and reading of the mail is judged (step S4).

If the security level of the file data is higher than a predetermined level (equivalent to LEVEL 3 in the present embodiment), the file data is a confidential document; thus, erase operation is given in preference even if it is a file attached to an unopened e-mail (YES in step S34); and the attached file is erased immediately (step S36). On the other hand, if the security level is lower than or equivalent to the predetermined level, opening operation of the e-mail is given preference (NO in step S34); and, after the e-mail is read (step S35), the attached file is erased (step S36).

If the e-mail is already read (YES in step S32), the attached file data is erased immediately (step S36).

In this manner, when a user specifies data to be erased on the image forming apparatus 1, the corresponding data is removed from the HDD 160 in the image forming apparatus 1; an instruction to erase the transferred file is notified from the sender image forming apparatus 1 to the transfer destination device; and the corresponding file data is erased in the destination computer terminal. It is thus possible to prevent such an inconvenience that, although the data in the sender image forming apparatus is removed, the data transferred to a destination image forming apparatus remains unerased, and thus, the security is improved.

Then, information about completion of erasure of the attached file is transmitted to the sender image forming apparatus (step S37), and the procedure is terminated.

Hereinafter, states, deletion date and time and others of the transferred file, when the files are erased, will be described with reference to FIG. 11.

Figure 11:
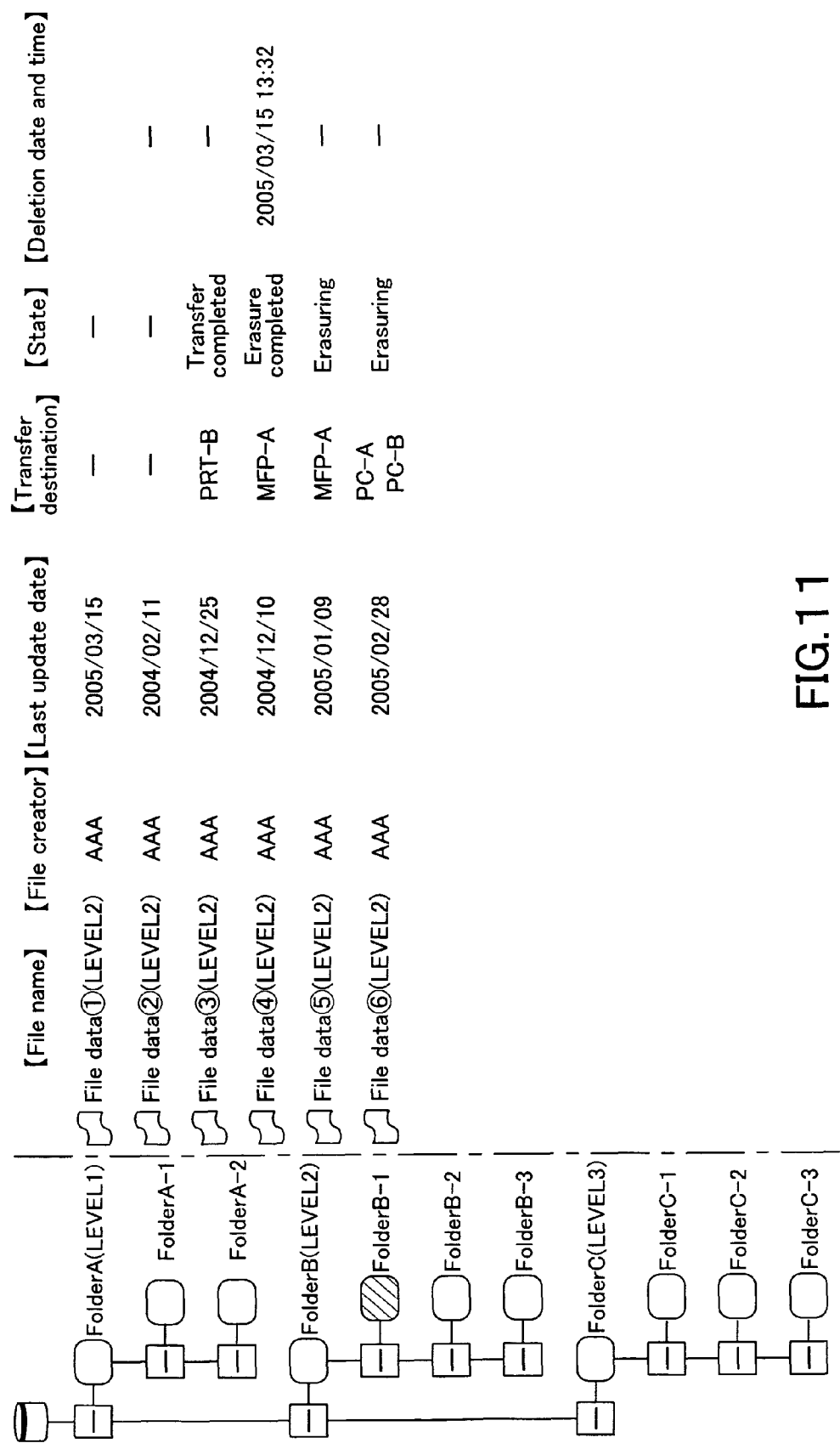
FIG. 11 is a view showing the screen of a display unit in an operation panel displaying file-data erasure history information.

FIG. 11 is a screen on the display unit 151 in the operation panel 150, displaying the folder configuration of the Box data in the HDD 160 in the sender image forming apparatus 1, the data stored in a selected folder, and erasure history information. It is possible to confirm the erasure history of individual file data and give an erase instruction on this screen.

Similarly to FIG. 4, file name, file creator (same as owner), last update date, transfer destination, state, and deletion date and time are displayed for each file data in a selected folder. File data with no transfer destination means untransferred, while file data with a transfer destination means transferred and stored. What is different from the file data transfer information in FIG. 4, "state" indicating the state of erasure or transfer of the file data and "deletion time and data" indicating the data and time of completion of erasure, are also displayed additionally. When the file data is already transferred, it is displayed as "transfer completed" in the "state" display menu and as " . . . " in the "deletion date and time" menu.

When the file data is waiting in the standby mode in the destination apparatus to be processed after the active job or the reserved job which is preferential, it is displayed as "erasing" in the "state" menu and " . . . " in the "deletion date and time". When the file data is already erased, displayed as "erasure completed", and as "2005/03/0513:32" respectively.

In this way, because not only the erasure history information of original transfer file data but also the erasure history of the transferred file data in the destination apparatus are stored in the memory 170 of the sender image forming apparatus 1, it is possible to manage all erasure history information collectively in the sender image forming apparatus 1, and thus, such a system is advantageous.

Similarly as described above, a user can browse the folder configuration of the Box data in the HDD and the erasure history of the file data stored in a selected folder, and also gives an instruction to erase the file from a computer terminal PC-A or PC-B having an installed dedicated utility software via the network 100.

Optionally, the system may be so configured that a user can do browsing/file operation/job operation of the file data transferred and backuped in the transfer destination image forming apparatus, or to the contrary, that a user cannot do browsing/file operation/job operation of the transferred file data (or cannot even browse the transferred file data).

In the former case, the transferred and backuped file data in the transfer destination image forming apparatus may be retransmitted or resent as e-mail-attached data to yet another apparatus, and the present invention is of course applicable to such a re-transfer of the file data.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrate herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitation in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "not well."

What is claimed is:

1. An image forming system including a first image forming apparatus and a second image forming apparatus that are connected to each other via a network, the first image forming apparatus, comprising:
 a transmitter unit transferring reproduced image data as a of original image data to the second image forming apparatus via the network;
 a memory unit storing the original image data; and
 a data eraser unit erasing the original image data in the memory unit and transmitting an instruction to erase the corresponding reproduced image data to the second image forming apparatus when a user inputs an instruction to erase the original image data, wherein the data eraser unit determines whether the original image data is subject to a security setting, and if so, the instruction to the second image forming device is to erase the reproduced image data immediately, and if not, the instruction to the second image forming device is to erase the reproduced image data according to a delay time setting, and the second image forming apparatus, comprising:
 a receiver unit receiving the transferred reproduced image data;
 a memory unit storing the received reproduced image data; and
 an eraser unit erasing the corresponding reproduced image data in the memory unit according to the erase instruction transmitted from the first image forming apparatus.

2. The image forming system as recited in claim 1, wherein the data eraser unit in the first image forming apparatus controls and revises the notice timing of the erase instruction to the second image forming apparatus.

3. The image forming system as recited in claim 1, wherein the eraser unit in the second image forming apparatus decides the delay time setting to erase the reproduced image data according to the priority order between erasure of the reproduced image data and any active job.

4. The image forming system as recited in claim 1, wherein the first image forming apparatus further comprising a memory storing data-erasure history information of the first image forming apparatus and data-erasure history information of the second image forming apparatus.

5. An image forming system including an image forming apparatus and a device receiving a data-attached e-mail therefrom that are connected to each other via a network, the image forming apparatus, comprising:
 a transmitter unit transferring an e-mail carrying attached reproduction image data of original image data to a particular address via the network;
 a memory unit storing the original image data; and
 a data eraser unit erasing the original image data in the memory unit and notifying an instruction to erase the corresponding reproduction image data attached to the e-mail to the device when a user inputs an instruction to erase the original image data, wherein the data eraser unit determines whether the original image data is subject to a security setting, and if so, the instruction to the device is to erase the reproduction image data immediately, and if not, the instruction to the device is to erase the reproduction image data according to a delay time setting, and the device, comprising:
 a receiver unit receiving the e-mail;
 a memory unit storing the reproduction image data attached to the received e-mail; and
 a data eraser unit erasing the corresponding reproduction image data in the memory unit according to the erase instruction notified from the image forming apparatus.

6. The image forming system as recited in claim 5, wherein the data eraser unit in the device decides the erase timing of the reproduction image data according to whether the data-attached e-mail is already opened or not yet, or whether the state of the e-mail turns to be as "already opened" or not yet.

7. The image forming system as recited in claim 5, wherein the data eraser unit in the image forming apparatus controls and revises the notice timing of the erase instruction to the device.

8. The image forming system as recited in claim 5, wherein the data eraser unit in the device decides the delay time setting to erase the reproduction image data according to the priority order between erasure of the reproduction image data and any active job.

9. The image forming system as recited in claim 5, wherein the image forming apparatus further comprising a memory storing data-erasure history information of the image forming apparatus and data erasure history information of the device.

10. An image forming apparatus, comprising:
 a transmitter unit transferring reproduction image data of original image data via a network to another image forming apparatus;
 a memory unit storing the original image data; and
 a data eraser unit erasing the original image data in the memory unit and notifying an instruction to erase the corresponding reproduction image data to the other image forming apparatus when a user inputs an instruction to erase the original image data, wherein the data eraser unit determines whether the original image data is subject to a security setting, and if so, the instruction to the other image forming apparatus is to erase the reproduction image data immediately, and if not, the instruction to the other image forming apparatus is to erase the reproduction image data according to a delay time setting.

11. The image forming apparatus as recited in claim 10, wherein the data eraser unit controls and revises the notice timing of the erase instruction to the other image forming apparatus.

12. The image forming apparatus as recited in claim 10, further comprising a memory storing data erasure history information thereof and data erasure history information of the other image forming apparatus.

13. An image forming apparatus, comprising:
 a transmitter unit transferring an e-mail carrying attached reproduction image data of original image data via a network to a particular address;
 a memory unit storing the original image data; and
 a data eraser unit erasing the original image data in the memory unit and notifying an instruction to erase the corresponding reproduction image data attached to the e-mail to a device capable of receiving the e-mail when a user inputs an instruction to erase the original image data, wherein the data eraser unit determines whether the original image data is subject to a security setting, and if so, the instruction to the device is to erase the reproduction image data immediately, and if not, the instruction to the device is to erase the reproduction image data according to a delay time setting.

14. The image forming apparatus as recited in claim 13, wherein the data eraser unit controls and revises the notice timing of the erase instruction to the device.

15. The image forming apparatus as recited in claim 13, further comprising a memory storing data erasure history information thereof and data erasure history information of the device.

16. An image forming apparatus, comprising:
a receiver unit receiving reproduction image data of original image data transferred from another image forming apparatus via a network;
a memory unit storing the received reproduction image data; and
a data eraser unit that, when a user inputs an instruction to erase the original image data on the other image forming apparatus, erases the corresponding reproduction image data in the memory unit according to the erase instruction notified from the other image forming apparatus, wherein the data eraser unit determines whether the reproduction image data is subject to a security setting, and if so, erases the reproduction image data immediately, and if not, erases the reproduction image data according to a delay time setting.

17. The image forming apparatus as recited in claim 16, the data eraser unit decides the delay time setting to erase the reproduction image data according to the priority order between erasure of the reproduction image data and any active job.

18. A device, comprising:
a receiver unit receiving an e-mail carrying an attached reproduction image data of original image data transferred from an image forming apparatus via a network;
a memory unit storing the reproduction image data attached to the received e-mail; and
a data eraser unit that, when a user inputs an instruction to erase the original image data on the image forming apparatus, erases the corresponding e-mail-attached reproduction image data in the memory unit according to the erase instruction notified from the image forming apparatus, wherein the data eraser unit determines whether the reproduction image data is subject to a security setting, and if so, erases the reproduction image data immediately, and if not, erases the reproduction image data according to a delay time setting.

19. The device as recited in claim 18, wherein the data eraser unit decides the erase timing of the attached reproduction image data according to whether the reproduction image data-attached e-mail is already opened or not yet, or whether the state of the e-mail turns to be as "already opened" or not yet.

20. The device as recited in claim 18, wherein the data eraser unit decides the delay time setting to erase the reproduction image data according to the priority order between erasure of the reproduction image data and any active job.

21. A non-transitory computer readable medium storing a data erase program to make a computer provided in an image forming apparatus execute processing comprising the steps of:
transferring reproduction image data of original image data via a network to another image forming apparatus;
storing the reproduction image data in a memory unit of the image forming apparatus; and
erasing the original image data in the memory unit and, when a user inputs an instruction to erase the original image data on the image forming apparatus, determining whether the original image data is subject to a security setting, and if so, sending an instruction to the other image forming apparatus to immediately erase the corresponding reproduction image data, and if not, sending an instruction to the other image forming apparatus to erase the corresponding reproduction image data according to a delay time setting.

22. A non-transitory computer readable medium storing a data erase program to make a computer provided in an image forming apparatus execute processing comprising the steps of:
transferring an e-mail carrying attached reproduction image data of original image data via a network to a particular address;
storing the original image data in a memory unit of the image forming apparatus; and
erasing the original image data in the memory unit and, when a user inputs an instruction to erase the original image data on the image forming apparatus, determining whether the original image data is subject to a security setting, and if so, sending an instruction to the device to immediately erase the corresponding reproduction image data attached to the e-mail, and if not, sending an instruction to the device to erase the corresponding reproduction image data attached to the e-mail according to a delay time setting.

23. A non-transitory computer readable medium storing a data erase program to make a computer provided in an image forming apparatus execute processing comprising the steps of:
receiving reproduction image data of original image data transferred from another image forming apparatus via a network;
storing the received reproduction image data in a memory unit of the image forming apparatus; and
when a user inputs an instruction to erase the original image data on the other image forming apparatus, determining whether the original image data is subject to a security setting, and if so, immediately erasing the corresponding reproduction image data in the memory unit according to the erase instruction notified from the other image forming apparatus, and if not, erasing the reproduction image data in the memory unit according to the erase instruction notified from the other image forming apparatus according to a delay time setting.

24. A non-transitory computer readable medium storing a data erase program to make a computer execute processing comprising the steps of:
receiving an e-mail carrying attached reproduction image data of original image data transferred from an image forming apparatus via a network;
storing the reproduction image data attached to the received e-mail in a memory unit; and
when a user inputs an instruction to erase the original image data on the image forming apparatus, determining whether the original image data is subject to a security setting, and if so, immediately erasing the corresponding e-mail-attached reproduction image data in the memory unit according to the erase instruction notified from the image forming apparatus, and if not, erasing the corresponding e-mail-attached reproduction image data in the memory unit according to a delay time setting.

* * * * *